United States Patent [19]

Pecota

[11] 4,123,668

[45] Oct. 31, 1978

[54] AUTOMOTIVE DOME LIGHT CONTROL WITH VARIABLE-TIME AUTOMATIC HOLDING

[75] Inventor: Walter Pecota, Boonton, N.J.

[73] Assignee: Wagner Electric Corporation, St. Louis, Mo.

[21] Appl. No.: 803,663

[22] Filed: Jun. 6, 1977

[51] Int. Cl.$^2$ .............................................. B60Q 3/02
[52] U.S. Cl. .................................. 307/10 LS; 315/84
[58] Field of Search .................. 307/10 LS, 112, 117, 307/141; 315/84, 77, 80; 361/195; 337/37

[56] References Cited

U.S. PATENT DOCUMENTS 2,802,142   6/1957   Johnson ................................. 315/84

Primary Examiner—L. T. Hix
Assistant Examiner—S. D. Schreyer
Attorney, Agent, or Firm—Eyre, Mann, Lucas & Just

[57] ABSTRACT

An automotive dome light control switch maintains the dome light illuminated for a first time period after a door is shut and for a second, shorter, time period after the ignition is turned off. If the ignition switch is turned on during the first time period, the dome light is immediately extinguished. The dome light may always be turned on by the dome light switch.

15 Claims, 6 Drawing Figures 4,123,668

AUTOMOTIVE DOME LIGHT CONTROL WITH VARIABLE-TIME AUTOMATIC HOLDING

SUMMARY OF THE INVENTION

An automotive light control closes relay contacts when a door is opened. When the door is again shut, the relay contacts feed energizing power to a dome light through the first heater wire of a thermal delay relay. After a first time delay, the thermal delay relay terminates the power to the dome light. If the automotive ignition switch is turned on during the first time delay, a bucking relay coil immediately opens the relay contacts and terminates the power to the dome light. While the ignition switch is on, a preheater element preheats the thermal time delay. When the ignition switch is turned off, a compressed spring is released causing the relay contacts to close, thus illuminating the lamp. The preheated condition of the thermal time delay causes the lamp to remain illuminated for a second time period which is shorter than a first time period.

The controlled lamp may be located at any location inside or outside the vehicle but its preferred location is a dome light for general interior illumination.

DETAILED DESCRIPTION OF THE PREFERRED EMBODIMENT

Figure 1:
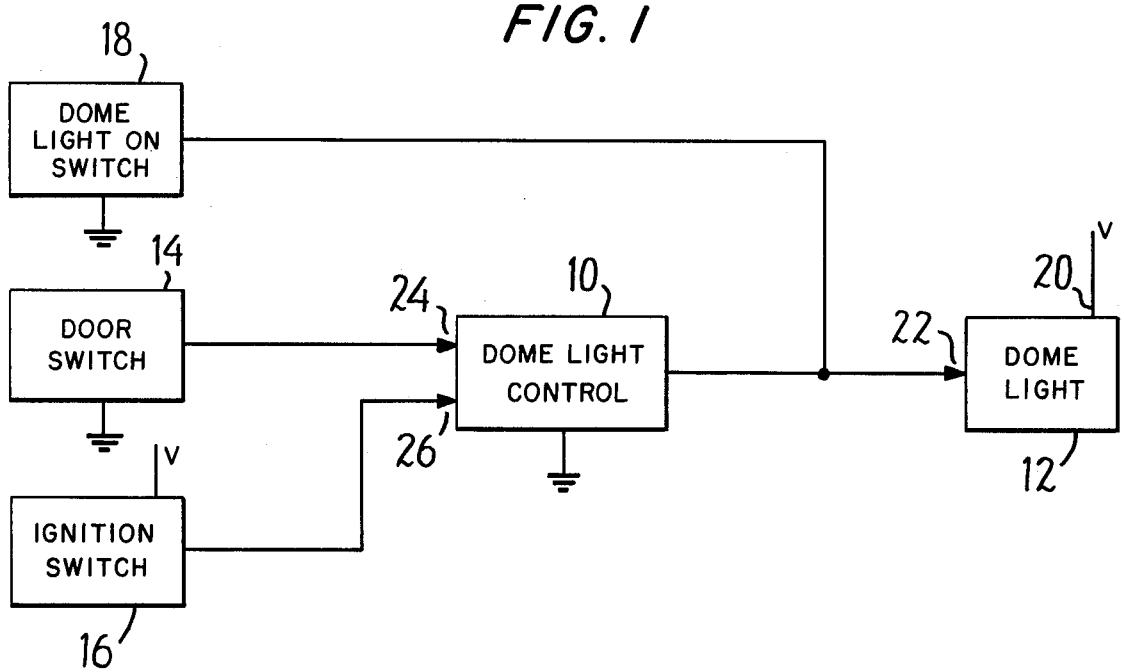
FIG. 1 shows a simplified block diagram of the invention as operatively interconnected with the remainder of the automotive system.

In FIG. 1, a dome light control 10 controls the timed illumination of a dome light 12 under various combinations of conditions of a door switch 14 and an ignition switch 16. A dome light ON switch 18 provides illumination of the dome light 12 independently of the dome light control 10.

The dome light 12 has battery voltage V constantly available at its first terminal 20. The dome light 12 is illuminated when a ground is connected to its second terminal 22. The dome light ON switch 18, which can be in any convenient location such as on the dome light, steering column or ganged with the headlight switch (none shown), can be placed in the ON position which directly completes the circuit to ground and illuminates the dome light 12.

When the door is opened and closed, it is desirable that the dome light 12 be illuminated for a short time, then extinguished. This is especially convenient when one enters the vehicle at night since it provides interior lighting which is useful for finding and securing seat belts, finding the ignition lock and guiding an ignition key into it and operating door locks. Door switch 14 is conveniently of the type which is open when the vehicle door is closed and closed when the vehicle door is opened. The door switch 14 is connected to the dome light control 10 at terminal 24. When the door is opened, the ground applied at terminal 24 is connected through the dome light control 10 to terminal 22 of the dome light 12. Thus the dome light 12 is illuminated when the door is opened. In addition, internal switching takes place in the dome light control 10 when the door switch 14 is closed which enables a first fixed timing cycle to begin upon reopening of the door switch 14. When the door is closed, the dome light control 10 provides a continuing ground signal to the dome light 12 for the duration of the first fixed timing cycle or until interrupted as will be explained in the following.

When the vehicle is started, it is usually desirable that the dome light 12 be immediately extinguished in order that it not interfere with the driver's vision. The ignition switch 16 connects a voltage V to a second input 26 of the dome light control 10 whenever the ignition switch is in the ON position. If the placing of the ignition switch 16 in the ON position should occur during a first fixed timing cycle during which the dome light control 10 is providing continued illumination of the dome light 12, the first fixed timing cycle is immediately terminated and the dome light 12 is immediately extinguished.

When the ignition switch 16 is placed in the OFF position, as for example in parking the vehicle, it is convenient that the dome light 12 be illuminated for a second fixed timing cycle to enable finding the seat belt latches and personal articles before leaving the vehicle. The second fixed timing cycle may conveniently be shorter than the first fixed timing cycle because the activities usually performed on stopping the vehicle may customarily take less time than those performed following entry and during starting.

Figure 2:
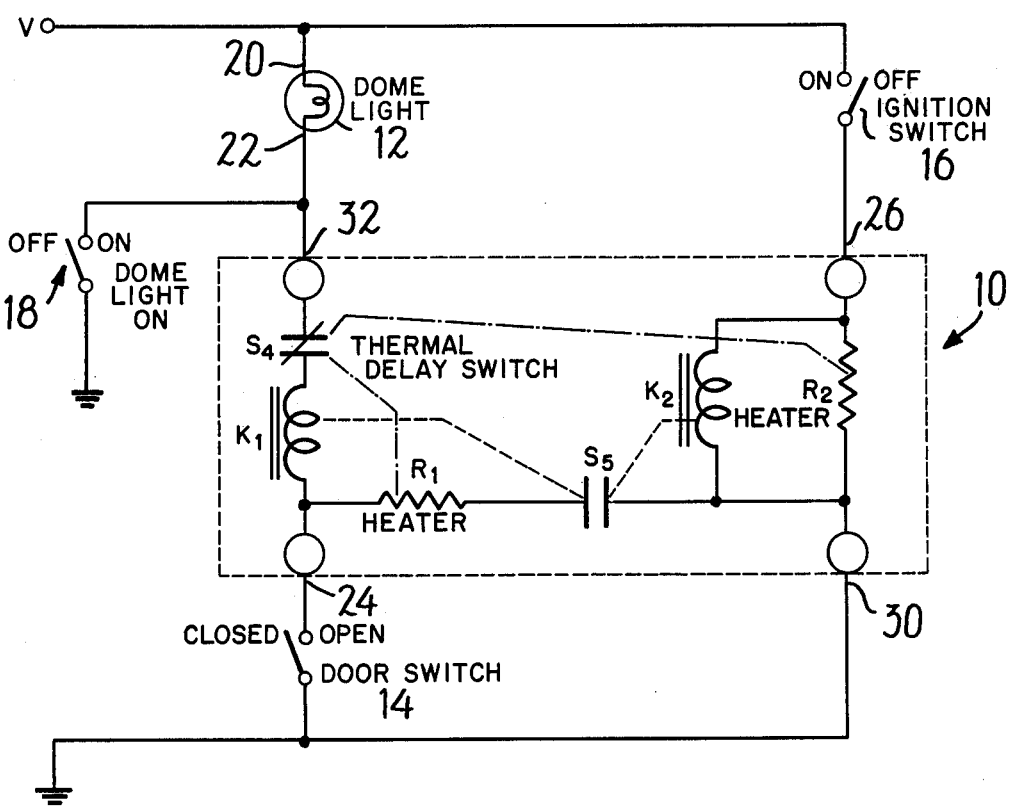
FIG. 2 shows a schematic diagram of one embodiment of the invention.

Referring now to FIG. 2, the condition of switches and the dome light control 10 shown is as encountered in the normal parked condition with the vehicle stopped, door closed, and ignition off. Dashed lines indicate mechanical connections, dash-dot lines indicate thermal transfer.

When the door switch 14 is closed by the opening of its associated door, the ground signal placed at the terminal 24 is transmitted through the coil of relay K1 and the normally closed contacts of thermal delay switch S4 to terminal 22 of dome lamp 12. The dome lamp 12 is thus illuminated. The current in relay coil K1 closes normally open relay contacts S5. Heater R1 on thermal delay switch S4 remains de-energized at this time since it is shunted by now closed relay contacts S5 and closed door switch 14.

When door switch 14 is opened by the closing of the door, relay contacts S5 are maintained in the closed condition by lamp current flowing in the path S4, K1, R1 and S5. Thus lamp current flows in and heats heater R1. After a first fixed timing cycle, thermal delay switch S4 becomes heated sufficiently to open its contacts. Lamp current is thus cut off and dome light 12 is extinguished. When the current through relay coil K1 is terminated, relay contacts S5 are opened. Thus when the thermal delay switch S4 cools sufficiently to close its contacts, the ground path through relay contacts S5 remains open. The dome light 12 therefore remains extinguished at the end of the first fixed timing cycle.

If the ignition switch 16 is placed in the ON position during the first fixed timing cycle, the supply current thus available at terminal 26 flows through relay coil K2. Relay coil K2 is wound on the same magnetic member as relay coil K1 but acts in the opposite sense from relay coil K1. When the supply current flows through relay coil K2, it cancels the effect of energized relay coil K1 and causes the relay contacts S5 to open. The opening of relay contacts S5 terminates the first fixed timing cycle and extinguishes the dome light 12. The magnetic force imparted to the movable member of relay contacts S5 also compresses a spring (not shown) and holds it compressed. The function of the spring will be explained later.

When ignition switch 16 is placed in the ON position, current flows through heater R2. Heater R2 is on thermal delay switch S4 along with heater R1 but heater R2 generates insufficient heat to cause thermal delay switch S4 to open. Instead, heater R2 merely preheats thermal delay switch S4.

When the ignition switch 16 is placed in the OFF position, the spring (not shown), which was previously held compressed by the movable member of contacts S5 is released causing the movable member to swivel on its support. The swivel motion of the movable member momentarily forces the contacts S5 together. The momentary closure of contacts S5, provides a path from ground to the dome light 12 through contacts S5, heater R1, relay coil K1 and closed thermal delay switch S4. The current in relay coil K1 holds contacts S5 closed. The dome light 12 is illuminated while the just described condition remains unchanged.

Lamp current through heater R1 heats thermal delay switch S4. In the sequence just described, thermal delay switch S4 is preheated to an elevated temperature below that required to open. Due to the preheating, thermal delay switch S4 opens its contacts after a shorter delay than was the case without preheating. Thus the second fixed timing cycle initiated by closing then opening the ignition switch 16 is of shorter duration than the first fixed timing cycle initiated by opening then closing the vehicle door.

If the ignition switch 16 is placed in the ON position during the second fixed timing cycle relay coil K2 immediately terminates the timing cycle by opening contacts S5 in the manner previously described.

Figure 3:
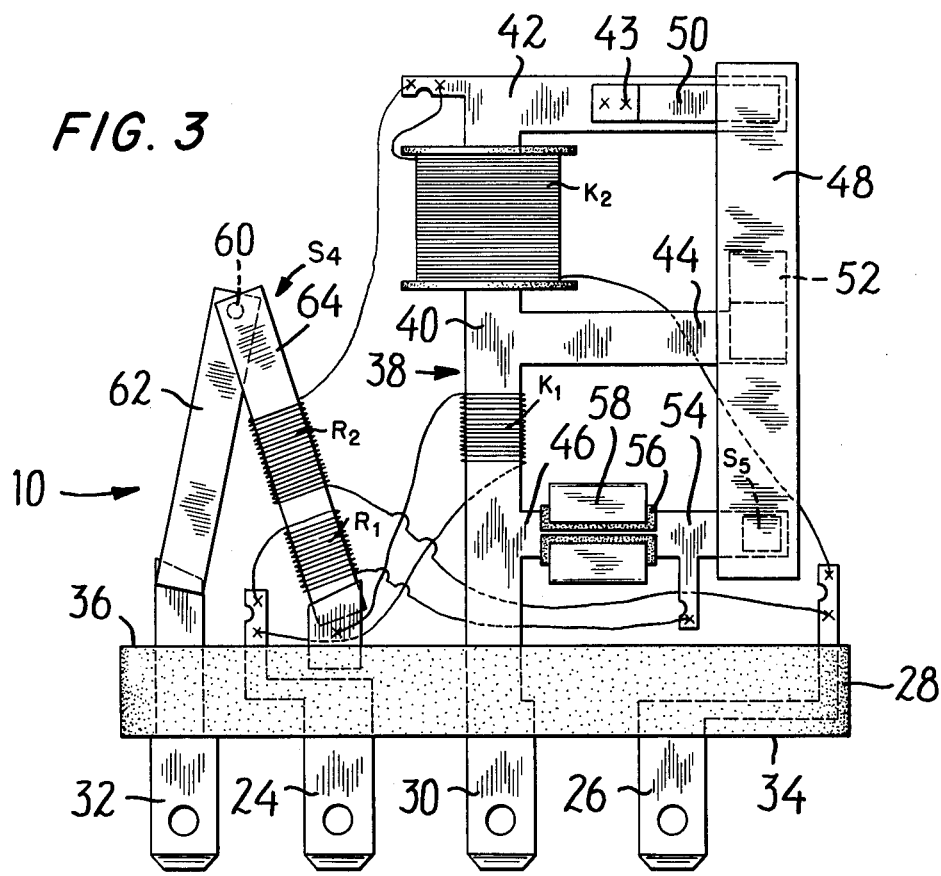
FIG. 3 shows a side elevation of an embodiment of the invention.

Referring now to FIG. 3, there is shown one embodiment of the dome light control 10 having a base 28 of suitable insulating material such as molded plastic. Terminal 24, 26, 30 and 32 protrude through one side 34 of the base 28. The terminals 24, 26, 30 and 32 are connected through the second side 36 of base 28 and provide mechanical support and electrical connection to elements of the dome light control 10.

A magnetic structural member 38 has a vertical strut 40, two long arms 42 and 44 and one short arm 46. Relay coil K1 is wound on the vertical strut 40 between the short arm 46 and the lower long arm 44. Relay coil K2, having many more turns than relay coil K1, is wound on the vertical strut 40 between the two long arms 42 and 44. A movable armature 48 is affixed to the lower long arm 44 by a fulcrum spring 52 (fulcrum spring 52 is hidden behind the armature 48 and is shown in dashed outline). The upper end of the armature 48 bears against a flat spring 50 which is attached to the upper long arm 42 be well known means such as spot welds 43.

A contact holder 54 is mechanically connected to the short arm 46 but is electrically insulated from it. An insulating layer 56 is wrapped around the short arm 46 and the contact holder 54 is clamped against the insulating layer 56 by a clamp 58. The clamp 58 and contact holder 54 may optionally be formed of a single piece of metal and, in fact, this is the preferred embodiment. Relay contacts S5 are hidden by the armature 48 and are shown dashed.

The thermal delay switch S4 in this embodiment is made of two bimetallic strips 62, 64 having normally closed contacts 60 on their mating faces. The use of bimetallic material for both strips 62, 64 provides compensation for variations in ambient temperature. Heaters R1 and R2 are both wound on strip 64. The thermal delay switch S4 may be a snap switch of a type well known in the art. Furthermore, the thermal delay switch S4 may be replaced by an electronic or electro-mechanical time delay.

Figure 4:
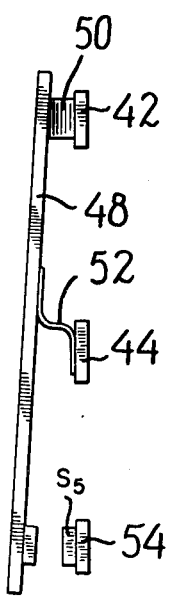
FIGS. 4, 5 and 6 show the positions of the relay armature and contacts under different conditions of relay coil energization.

FIG. 4 shows the condition of the armature 48 and the contacts S5 when both relay coils K1 and K2 are deenergized. The fulcrum spring 52 holds the armature 48 outward and maintains contacts S5 open.

Figure 5:
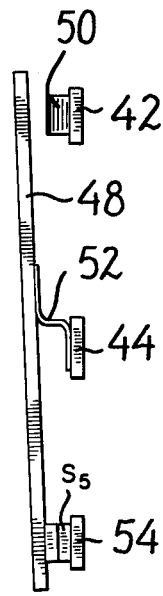

FIG. 5 shows the condition when relay coil K1 is energized and relay coil K2 is deenergized. The armature 48 is drawn inward toward contact holder 54 and the contacts S5 are closed.

Figure 6:
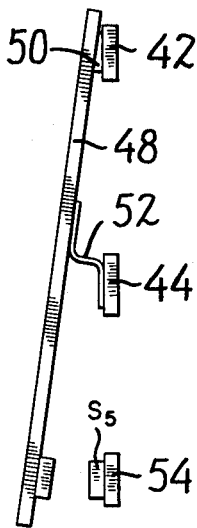

FIG. 6 shows the condition when relay coil K2 is energized regardless of the condition of energization or deenergization of relay coil K1. The flat spring 50 is compressed by the energization of relay coil K2. This pivots the armature 48 about fulcrum spring 52 and consequently opens contacts S5. When relay coil K2 is again deenergized, the potential energy stored in the compression of spring 50 is suddenly released. The inertia of armature 48 is such as to rotate the movable contact of S5 into closing on its fixed contact. The momentary closure of S5 energized relay coil K1 and maintains contacts S5 closed for a timing cycle as previously explained.

It will be understood that the claims are intended to cover all changes and modifications of the preferred embodiments of the invention, herein chosen for the purpose of illustration which do not constitute departures from the spirit and scope of the invention.

What is claimed is:

1. A light control for controlling the energization and de-energization of a light for a vehicle having at least one door with an electric switch actuated thereby and at least one ignition switch having off and on positions said light control comprising:
    (a) first means for energizing said light for a first time period for actuation by the closing of the last of said at least one door having an electric switch;
    (b) means for immediately terminating said first time period before the end thereof for actuation by said ignition switch being switched from its off to its on position during said first time period, whereby said light is immediately extinguished;
    (c) second means for energizing said light for a second time period for actuation by the switching of said ignition switch from its on to its off position;
    (d) said means for immediately terminating also being effective to terminate said second time period for actuation by said ignition switch being switched from its off position to its on position during said second time period whereby said light is immediately extinguished.

2. The light control recited in claim 1 wherein said first means comprises:
    (a) a relay coil;
    (b) relay contacts associated with said relay coil;
    (c) said relay contacts being operative to energization of said relay coil at least upon the closing of said at least one door;
    (d) a thermal delay switch having a heater and switch contacts;

(e) said switch contacts being in series with said relay coil whereby opening of said switch contacts breaks electrical connection to one side of said relay coil;

(f) said heater being in series with said relay contacts; and (g) said heater being operative to thermally actuate said switch contacts into their open position at the end of said first time period which begins when lamp current begins flowing.

3. The light control recited in claim 2 further comprising:

(a) said switch contacts, relay coil, heater and relay contacts in said light control being in series with said light between two terminals of a power source; and (b) said electric switch being in shunt with said heater and relay contacts.

4. The light control recited in claim 2 further comprising:

(a) a second relay coil in series with said ignition switch between two terminals of a power source;

(b) said second relay coil being associated with said relay contacts; and (c) said second relay coil being operative upon being energized to open said relay contacts in the event of existing energization of said relay coil.

5. The light control recited in claim 4 further comprising:

(a) a second heater in parallel with said second relay coil;

(b) said second heater also being associated with said thermal delay switch; and (c) said second heater being effective to preheat said thermal delay switch and ineffective to open said switch contacts.

6. The light control recited in claim 5 wherein said second means contains means for momentarily closing said relay contacts upon the de-energization of said second relay coil by the placing of said ignition switch from the on to the off position.

7. The light control recited in claim 4 further comprising said second means containing means for momentarily closing said relay contacts upon the de-energization of said second relay coil by the placing of said ignition switch from the on to the off position.

8. The light control recited in claim 2 wherein said thermal delay switch further comprises:

(a) a first switch contact;

(b) means for holding said first switch contact;

(c) a bimetallic strip having a first end fixed and a second end free;

(d) a second switch contact on said bimetallic strip in opposed and contactable relationship with said first switch contact; and (e) said heater being adjacent said bimetallic strip.

9. The light control recited in claim 8 further comprising a second heater adjacent said bimetallic strip, said second heater being incapable of generating sufficient heat to actuate said switch contacts into the open position.

10. The light control recited in claim 8 further comprising:

(a) said means for holding being a second bimetallic strip having one end fixed and one end free; and (b) said second bimetallic strip and said bimetallic strip having dissimilar metals on the facing sides.

11. The light control recited in claim 6 wherein said means for momentarily closing comprises:

(a) potential energy storage means;

(b) said potential energy storage means storing potential energy when said second relay coil is energized;

(c) said potential energy storage means being operative to impart mechanical motion to at least part of said relay contacts upon the de-energization of said second relay coil; and (d) said motion being operative to at least momentarily close said relay contacts.

12. A light control for controlling the energization and de-energization of a light for a vehicle having at least one door with an electric switch actuated thereby and at least one ignition switch having off and on positions said light control unit comprising:

(a) a thermal delay switch having at least one thermally actuated element;

(b) a first switch contact actuated by said element;

(c) a second switch contact in normally closed mating relationship with said first switch contact;

(d) a first heater for actuating said element;

(e) said first heater being operative when energized to open said first and second switch contacts;

(f) a second heater for actuating said element;

(g) said second heater being operative to preheat said element but inoperative to open said first and second switch contacts;

(h) a first relay coil in series with said switch contacts, adapted to connection in series between said lamp and said electric switch between power terminals;

(i) normally open relay contacts actuatable into the closed position by the energization of said first relay coil;

(j) said relay contacts and said first heater being in series relative to each other and the series combination being adapted to be connected in parallel relative to said electric switch;

(k) a second relay coil adapted to be connected in series with said ignition switch between power terminals;

(l) said second relay coil being operative when energized to open said relay contacts in the event that they are being held closed by the energization of said first relay coil at the time said second relay coil becomes energized;

(m) said second heater being in parallel with said second relay coil; and (n) potential energy storage means for storing potential energy upon the energization of said second relay coil and operative upon the de-energization of said second relay coil to impart mechanical motion to at least a part of said relay contacts sufficient to accomplish at least momentary closure of said relay contacts.

13. The light control recited in claim 1 further comprising said first and second means for energizing containing means for permitting energization of said light by means external to said light control.

14. The light control recited in claim 1 wherein said first time period and said second time period have different durations.

15. The light control recited in claim 14 wherein said second time period is shorter than said first time period.

* * * * *